United States Patent
Takamatsu

(10) Patent No.: US 12,472,671 B2
(45) Date of Patent: Nov. 18, 2025

(54) INJECTION MOLDING MACHINE

(71) Applicant: THE JAPAN STEEL WORKS, LTD., Tokyo (JP)

(72) Inventor: Syunsuke Takamatsu, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 93 days.

(21) Appl. No.: 18/389,546

(22) Filed: Nov. 14, 2023

(65) Prior Publication Data

US 2024/0190058 A1   Jun. 13, 2024

(30) Foreign Application Priority Data

Dec. 12, 2022   (JP) .................................. 2022-197756

(51) Int. Cl.
*B29C 45/78* (2006.01)
*B29C 45/62* (2006.01)
*B29C 45/74* (2006.01)

(52) U.S. Cl.
CPC .............. *B29C 45/78* (2013.01); *B29C 45/62* (2013.01); *B29C 45/74* (2013.01); *B29C 2945/7604* (2013.01); *B29C 2945/76193* (2013.01); *B29C 2945/76531* (2013.01); *B29C 2945/76672* (2013.01)

(58) Field of Classification Search
CPC .......... B29C 45/78; B29C 45/62; B29C 45/74
See application file for complete search history.

(56) References Cited

U.S. PATENT DOCUMENTS 6,305,923 B1 * 10/2001 Godwin .............. B29C 45/2737
425/572
2007/0181537 A9 * 8/2007 Kornrumpf ....... B29C 66/91443
219/50

(Continued)

FOREIGN PATENT DOCUMENTS

CN       207359513 U  *  5/2018
FR         3100472 A1 *  3/2021   ......... B29C 45/7331

(Continued)

OTHER PUBLICATIONS

Machine translation JPH09262886A (Year: 1997).*

(Continued)

*Primary Examiner* — Abbas Rashid
*Assistant Examiner* — Wayne K. Swier
(74) *Attorney, Agent, or Firm* — Potomac Law Group, PLLC

(57) ABSTRACT

A cylinder that kneads an injection material, a heat insulating cover that covers a side surface of the cylinder, the heat insulating cover including a first end portion and a second end portion, a heater arranged between the heat insulating cover and the cylinder, the heater heating a first region of the cylinder, and a first heat pipe that thermally connects the first region and a second region to each other, the second region being different from the first region, are provided. The heat insulating cover includes the first end portion and the second end portion through which the injection material passes, and the first region is closer to a midpoint between the first end portion and the second end portion than the second region.

11 Claims, 10 Drawing Sheets

(56) References Cited

U.S. PATENT DOCUMENTS

| | | | | |
|---|---|---|---|---|
| 2007/0222125 A1* | 9/2007 | Grajewski | ............... | B29C 48/83 |
| | | | | 264/645 |
| 2014/0117573 A1* | 5/2014 | Fitzpatrick | .............. | B29C 48/92 |
| | | | | 264/40.3 |
| 2021/0031423 A1* | 2/2021 | Yamashita | .............. | B29C 45/20 |
| 2021/0078230 A1* | 3/2021 | Ifland | ...................... | B29C 45/78 |

FOREIGN PATENT DOCUMENTS

| | | | | | |
|---|---|---|---|---|---|
| JP | H09262886 A | * | 10/1997 | ......... | B29C 48/9185 |
| JP | 2016-112772 A | | 6/2016 | | |
| KR | 20170067538 A | * | 6/2017 | ............. | B29C 45/72 |

OTHER PUBLICATIONS

Machine translation JP2016112772A (Year: 2016).*
Machine translation KR20170067538A (Year: 2017).*
Machine translation CN207359513U (Year: 2018).*
Machine translation FR3100472A1 (Year: 2021).*

* cited by examiner

FIG.1 [FIRST EMBODIMENT]

[FIRST EMBODIMENT]

FIG.8 [SECOND EMBODIMENT]

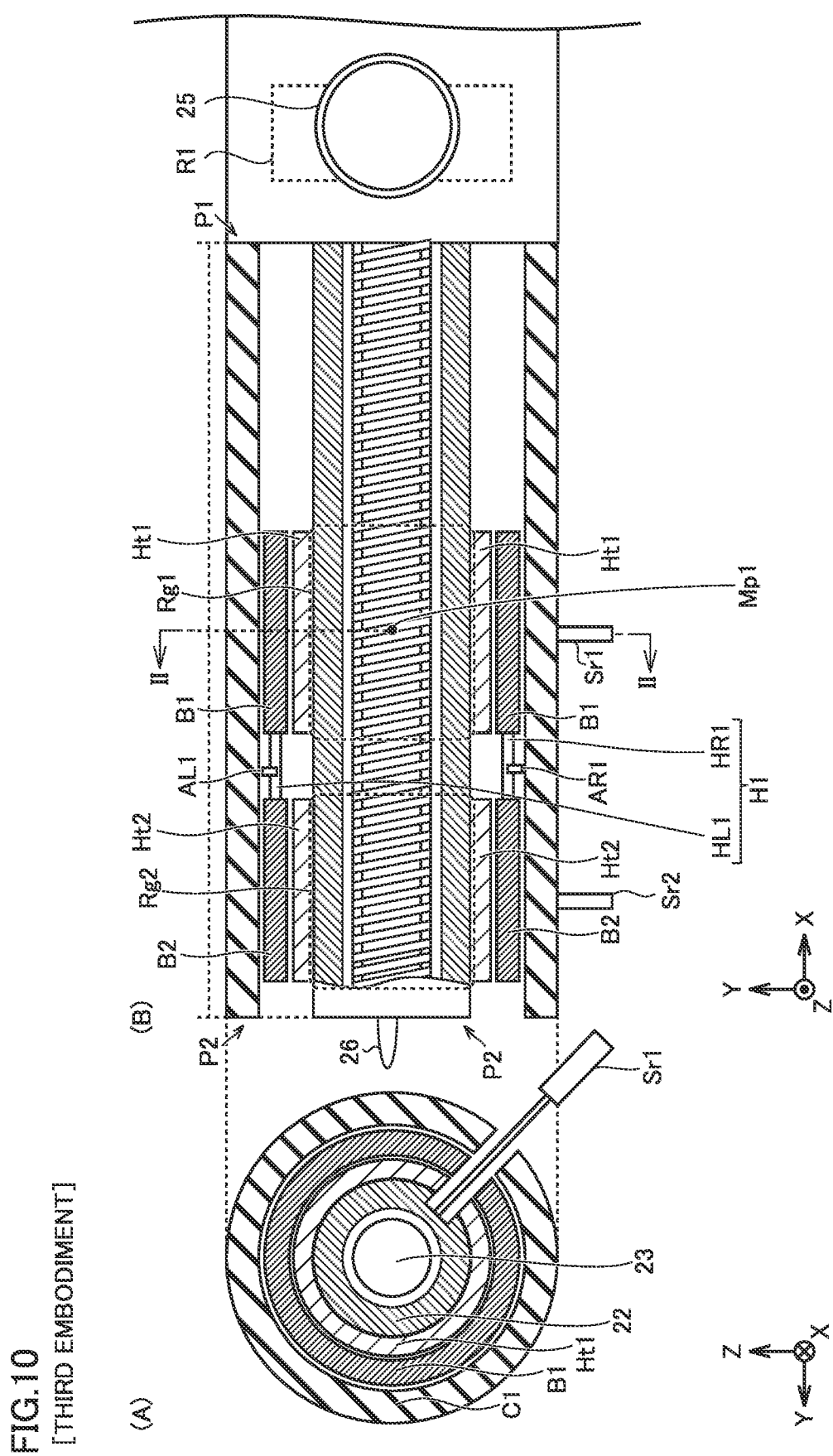
FIG.10 [THIRD EMBODIMENT]

INJECTION MOLDING MACHINE

CROSS REFERENCE TO RELATED APPLICATIONS

This nonprovisional application is based on Japanese Patent Application No. 2022-197756 filed with the Japan Patent Office on Dec. 12, 2022, the entire contents of which are hereby incorporated by reference.

BACKGROUND OF THE INVENTION

Field of the Invention

The present disclosure relates to an injection molding machine.

Description of the Background Art

An injection molding machine is used in a factory for molding of a molded article composed of resin such as plastic as a substrate. Patent Literature 1 (Japanese Patent Laying-Open No. 2016-112772) discloses a technique relating to a method of controlling a temperature of a heating cylinder.

The injection molding machine in Patent Literature 1 includes a heating cylinder that melts resin. The heating cylinder in Patent Literature 1 has a side surface covered with a heat insulating cover. A plurality of band heaters are arranged between the side surface of the heating cylinder and the heat insulating cover. In Patent Literature 1, a heat pump circuit in addition to the plurality of band heaters is provided between the side surface of the heating cylinder and the heat insulating cover. When a temperature of the heating cylinder becomes higher than a target temperature, the heat pump circuit cools the inside of the heat insulating cover with cooling fluid.

SUMMARY OF THE INVENTION

In the injection molding machine in Patent Literature 1, the heat insulating cover can suppress abrupt lowering in temperature of the heating cylinder increased in temperature by the plurality of band heaters, due to exposure thereof to outside air. In other words, the heat insulating cover suppresses ready release of heat in the inside thereof to the outside to keep the temperature of the heating cylinder. In the inside of the heat insulating cover, however, heat release is suppressed, which may result in a region less likely to lower in temperature. The region in the inside of the heat insulating cover less likely to lower in temperature may excessively increase in temperature due to turn-on of the heater that heats the cylinder.

The present disclosure was made to solve such a problem, and an object thereof is to provide an injection molding machine that achieves suppression of occurrence of excessive temperature increase in the inside of a heat insulating cover that covers a cylinder.

An injection molding machine according to one embodiment includes a cylinder that kneads an injection material supplied from outside and supplies the kneaded injection material to the outside, a heat insulating cover that covers a side surface of the cylinder, the heat insulating cover including a first end portion and a second end portion, a heater arranged between the heat insulating cover and the cylinder, the heater heating a first region of the cylinder, and a first heat pipe that thermally connects the first region and a second region of the cylinder to each other, the second region being different from the first region. The first region is closer to a midpoint between the first end portion and the second end portion than the second region.

The foregoing and other objects, features, aspects and advantages of this invention will become more apparent from the following detailed description of this invention when taken in conjunction with the accompanying drawings.

BRIEF DESCRIPTION OF THE DRAWINGS

FIG. 10 is a diagram for illustrating a structure of the heat insulating cover and the cylinder in a third embodiment.

DESCRIPTION OF THE PREFERRED EMBODIMENTS

Figure 1:
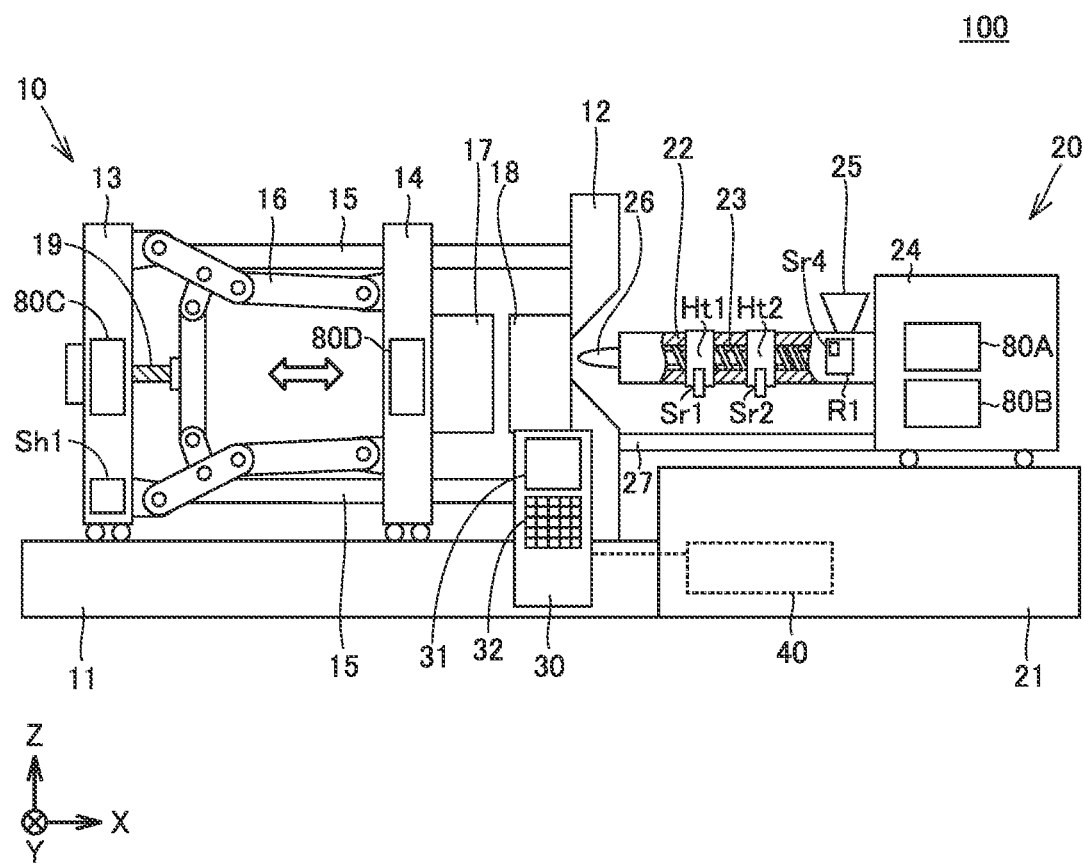
FIG. 1 is a diagram of an appearance of an injection molding machine.

An embodiment of the present disclosure will be described in detail below with reference to the drawings. The same or corresponding elements in the drawings have the same reference characters allotted and description thereof will not be repeated.

First Embodiment

<Overall Construction of Injection Molding Machine>

An injection molding machine 100 will be described below with reference to FIG. 1. FIG. 1 is a diagram of an appearance of injection molding machine 100. The overall construction of injection molding machine 100 will be described with reference to FIG. 1.

Injection molding machine 100 is placed on an XY plane. A direction perpendicular to the XY plane is defined as a Z-axis direction. A positive direction along a Z axis in FIG. 1 may hereinafter be referred to as an upper surface side or above and a negative direction thereof may be referred to as a lower surface side or below. Though injection molding machine 100 shown in FIG. 1 is shown as a lateral injection molding machine, injection molding machine 100 in the present embodiment is not limited to the lateral type but may be a vertical injection molding machine.

Injection molding processing performed by injection molding machine 100 includes a mold closing step, an injection step, a pressure holding step, a mold opening step, a cooling step, an ejection step, and a plasticization step. Injection molding machine 100 repeatedly performs a cycle of the injection molding processing. Injection molding machine 100 can mold a molded article of various shapes and materials, and performs injection molding processing in accordance with the shape and a type of the material of the molded article.

Injection molding machine 100 includes a mold clamping apparatus 10 that clamps a mold, an injection apparatus 20 that melts and injects an injection material, and a control panel 30. Mold clamping apparatus 10 is arranged on a side of the negative direction along an X axis with respect to injection apparatus 20.

<Mold Clamping Apparatus>

Mold clamping apparatus 10 in the present embodiment includes a fixed plate 12, a mold clamping housing 13, a moving plate 14, a tie bar 15, a mold clamping mechanism 16, molds 17 and 18, a ball screw 19, servo motors 80C and 80D, and a bed 11. Bed 11 holds fixed plate 12, mold clamping housing 13, moving plate 14, and the like. Each of mold clamping housing 13 and moving plate 14 is constructed as being slidable over bed 11 in an X-axis direction.

Tie bar 15 is arranged between fixed plate 12 and mold clamping housing 13, and couples fixed plate 12 and mold clamping housing 13 to each other. Injection molding machine 100 in the first embodiment includes four tie bars 15. Injection molding machine 100 may include, for example, five or more tie bars 15, without being limited to four tie bars.

Moving plate 14 is constructed as being slidable in the X-axis direction between fixed plate 12 and mold clamping housing 13. Mold clamping mechanism 16 is provided between mold clamping housing 13 and moving plate 14. Mold clamping housing 13 in the present embodiment includes a toggle mechanism. Mold clamping mechanism 16 may include a direct pressure type mold clamping mechanism. The direct pressure type mold clamping mechanism means a mold clamping cylinder.

Servo motor 80C is provided in mold clamping housing 13. Servo motor 80C drives mold clamping mechanism 16 with ball screw 19 being interposed. Ball screw 19 converts rotary motion from servo motor 80C into linear motion to drive mold clamping mechanism 16. Molds 17 and 18 are provided between fixed plate 12 and moving plate 14. Molds 17 and 18 are opened and closed as mold clamping mechanism 16 is driven. In other words, mold 17 is a mold movable by ball screw 19 and mold 18 is a mold fixed by fixed plate 12.

A step of transition from a state in which molds 17 and 18 are distant from each other to a state in which the molds are in intimate contact with each other is referred to as the "mold closing step." A step of transition from the state in which molds 17 and 18 are in intimate contact with each other to the state in which the molds are distant from each other is referred to as the "mold opening step." Servo motor 80C is used for the mold closing step and the mold opening step.

Injection molding machine 100 performs a step referred to as the "ejection step" after the mold opening step. The ejection step is a step of removing from mold 17, the solidified injection material after molds 17 and 18 are filled therewith. Specifically, a not-shown pin protrudes as a result of rotation of servo motor 80D and the molded article in intimate contact with mold 17 is removed. Servo motor 80D provided in moving plate 14 is used for the ejection step.

<Injection Apparatus>

Injection apparatus 20 includes a cylinder 22, a drive mechanism 24, a hopper 25, an injection nozzle 26, a nozzle touch apparatus 27, servo motors 80A and 80B, heaters Ht1 and Ht2, temperature sensors Sr1 and Sr2, and a cooling apparatus R1.

Cylinder 22 contains a screw 23 that kneads the injection material. Cylinder 22 has an appearance in a columnar shape. More specifically, cylinder 22 has the columnar shape with bottom surfaces on a nozzle side and a hopper side, respectively. A cavity is provided in the inside of cylinder 22 for storage of screw 23 and the injection material.

An opening for transport of the injection material is provided in the bottom surface on each of the nozzle side and the hopper side of cylinder 22. A surface that connects the two bottom surfaces of cylinder 22 is referred to as a "side surface" of cylinder 22 below. The side surface of cylinder 22 conforms to a curved surface of the columnar shape.

The shape of cylinder 22 is not limited to the columnar shape. Any shape like a post in which screw 23 can be stored such as a shape of a quadrangular prism or a triangular prism may be applicable. Injection molding machine 100 performs a step referred to as the "plasticization step" with the use of screw 23.

The plasticization step is a step of kneading injected resin by heating of cylinder 22 by heaters Ht1 and Ht2 and rotation of screw 23. Cylinder 22 is heated, for example, to a temperature of 180° C. to 350° C. by heaters Ht1 and Ht2 to melt the injection material. Heaters Ht1 and Ht2 are each a band heater that covers the side surface of cylinder 22. Though an example in which injection molding machine 100 includes two heaters Ht1 and Ht2 is shown in the first embodiment, in one aspect, injection molding machine 100 may include three or more heaters and may include, for example, ten to thirty heaters. The side surface of cylinder 22 in the first embodiment is further covered with a heat insulating cover. For the sake of simplicity of description, FIG. 1 does not show the heat insulating cover, and a structure of cylinder 22 including the heat insulating cover will be described in detail with reference to FIG. 2.

Servo motor 80B in drive apparatus 24 rotates screw 23 with the X-axis direction being defined as a central axis. In other words, servo motor 80B is a motor used for the plasticization step. Injection molding machine 100 performs a step referred to as the "injection step" and a step referred to as the "pressure holding step." The injection step is a step of injecting resin plasticized in the plasticization step into molds 17 and 18. The pressure holding step is a step of applying a pressure to hold the resin injected in the injection step in molds 17 and 18. Being driven by servo motor 80A, screw 23 slides in the negative direction along the X-axis direction. The plasticized resin is thus injected into molds 17 and 18. Servo motor 80A is used for the injection step or the pressure holding step.

Hopper 25 is provided on a side of the positive direction along the Z axis of cylinder 22, and the injection material yet to be plasticized is stored therein. In other words, a granular injection material yet to be molten is stored in hopper 25. The injection material stored in hopper 25 is transported to the inside of cylinder 22 as screw 23 is driven. Cooling apparatus R1 is arranged in the vicinity of a path through which the injection material passes from hopper 25 to cylinder 22.

Cooling apparatus R1 cools the injection material supplied from hopper 25 into cylinder 22. Thus, in injection molding machine 100, melting of the granular injection material stored in hopper 25 by heat generation by heaters Ht1 and Ht2 can be suppressed. When the injection material is molten before it reaches cylinder 22, clogging may occur in a path for transport of the injection material. In other words, in injection molding machine 100, during the injection molding processing, while heaters Ht1 and Ht2 heat cylinder 22 by generating heat, unintended melting of the injection material in hopper 25 can be suppressed with the use of cooling apparatus R1. Cooling apparatus R1 is, for example, a water cooling apparatus that circulates cooling water.

Controller 40 can adjust output of cooling apparatus R1. FIG. 1 shows a temperature sensor Sr4 that detects a temperature of cooling water circulated by cooling apparatus R1. Controller 40 obtains a temperature detected by temperature sensor Sr4 and adjusts output of cooling apparatus R1 in accordance with the obtained temperature.

As shown in FIG. 1, heater Ht1 heats a region around the center of cylinder 22 and heater Ht2 heats a region of cylinder 22 closer to cooling apparatus R1 than heater Ht1.

The injection material in cylinder 22 is transported from an end portion in the positive direction along the X axis toward an end portion on the side of the negative direction thereof as screw 23 rotates. In other words, the injection material is initially heated by heater Ht2 and then heated by heater Ht1. The injection material is thus kneaded. Temperature sensors Sr1 and Sr2 measure temperatures of regions heated by heaters Ht1 and Ht2, respectively. Temperature sensors Sr1 and Sr2 are each implemented, for example, by a thermocouple.

The kneaded injection material is transported to injection nozzle 26 provided at the end portion on the side of the negative direction along the X axis of cylinder 22. Nozzle touch apparatus 27 slides injection apparatus 20 itself in the X-axis direction to bring injection nozzle 26 into contact with a sprue bush of mold 18. The injection material is thus injected into mold 18.

A base 21 is arranged on the side of the positive direction along the X axis of bed 11 and holds drive mechanism 24 or the like. Base 21 contains controller 40 and a not-shown servo amplifier. The servo amplifier supplies electric power to servo motors 80A to 80D. Controller 40 obtains detection temperatures detected by temperature sensors Sr1 and Sr2 and control heaters Ht1 and Ht2 based on the obtained detection temperatures.

<Control Panel>

Control panel 30 includes a display apparatus 31 that shows information on the injection molding processing and an input apparatus 32 that accepts an operation by a user. Control panel 30 is electrically connected to controller 40. In an example in FIG. 1, control panel 30 is provided on the side of the negative direction along a Y axis of injection molding machine 100. In one aspect, control panel 30 may be provided separately from injection molding machine 100, and may be arranged, for example, in a room different from the factory where injection molding machine 100 is arranged.

Display apparatus 31 is implemented, for example, by a display. Input apparatus 32 is implemented, for example, by a plurality of buttons. In one aspect, display apparatus 31 and input apparatus 32 may integrally be provided as a touch panel. Control panel 30 may include a microphone and a speaker and may accept an operation by the user through voice and sound.

<Structure of Heat Insulating Cover and Cylinder>

Figure 2:
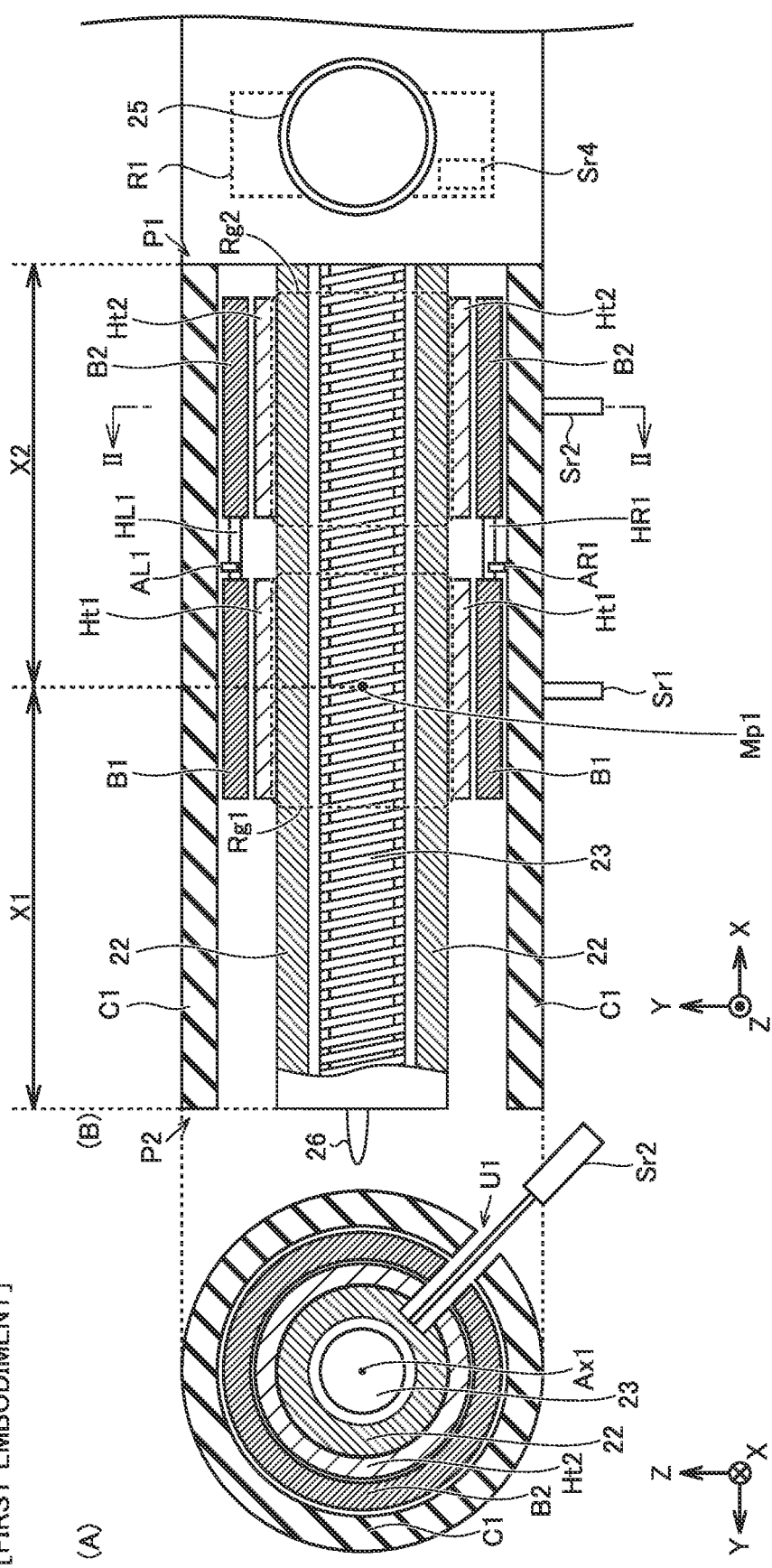
FIG. 2 is a diagram for illustrating a structure of a heat insulating cover and a cylinder in a first embodiment.

FIG. 2 is a diagram for illustrating a structure of a heat insulating cover C1 and cylinder 22 in the first embodiment. FIG. 2(A) is a cross-sectional view of heat insulating cover C1 and cylinder 22 when viewed from the side of the negative direction along the X axis. FIG. 2(B) is a diagram showing heat insulating cover C1 and cylinder 22 when viewed from the side of the positive direction along the Z axis. The line II-II in FIG. 2(B) shows a position of the cross-section shown in FIG. 2(A).

Heat insulating cover C1 covers cylinder 22 such that the side surface of cylinder 22 and heaters Ht1 and Ht2 are not exposed to outside air. Heaters Ht1 and Ht2 and heat radiation plates B1 and B2 are arranged between heat insulating cover C1 and cylinder 22. As shown in FIG. 2(A), cross-sections of screw 23, cylinder 22, heaters Ht1 and Ht2, heat radiation plates B1 and B2, and heat insulating cover C1 are all substantially in a circular shape, and form substantially a concentric shape around a rotation axis Ax of screw 23. Among screw 23, cylinder 22, heaters Ht1 and Ht2, heat radiation plates B1 and B2, and heat insulating cover C1, screw 23 is arranged innermost and heat insulating cover C1 is arranged outermost.

Heaters Ht1 and Ht2 heat respective regions Rg1 and Rg2. A target temperature is set for each of regions Rg1 and Rg2. The target temperature set for region Rg1 may be equal to or different from the target temperature set for region Rg2.

As shown in FIG. 2(A), a recess U1 is provided on the side of the negative direction along the Y axis and on the side of the negative direction along the Z axis in the cross-section of each of cylinder 22, heater Ht2, heat radiation plate B2, and heat insulating cover C1. Temperature sensor Sr2 implemented by the thermocouple is inserted in recess U1. Temperature sensor Sr2 thus detects the temperature of the region heated by heater Ht2.

Heat insulating cover C1 suppresses release of heat generated by heaters Ht1 and Ht2 to outside air. Since power consumption by heaters Ht1 and Ht2 necessary for melting of the injection material can thus be suppressed in injection molding machine 100, an energy saving effect can be achieved. Heat insulating cover C1 is formed, for example, of glass wool.

Heat insulating cover C1 that covers the side surface of cylinder 22 in the columnar shape is in a shape in conformity with the side surface in the columnar shape. Cylinder 22 includes an end portion where the injection material is supplied from a side of hopper 25 and an end portion where the injection material is supplied to injection nozzle 26. In other words, the inside of cylinder 22 communicates for passage of the injection material. Heat insulating cover C1 covers the side surface of cylinder 22. Heat insulating cover C1 includes an end portion P1 on the side of hopper 25 and an end portion P2 on the side of injection nozzle 26.

Since heat insulating cover C1 is in a shape in conformity with the side surface in the columnar shape, it is provided with an opening in each of end portion P1 and end portion P2. Therefore, heat in the inside of heat insulating cover C1 can be exchanged with an external apparatus or outside air through the openings in end portions P1 and P2. In other words, heat in the inside of heat insulating cover C1 is released through the openings in end portions P1 and P2. Though FIG. 2 shows an example in which heat insulating cover C1 covers the entire side surface of cylinder 22, in one aspect, heat insulating cover C1 may cover only a part of the side surface of cylinder 22. For example, heat insulating cover C1 may cover half the side surface of cylinder 22 on the side of hopper 25, that is, a region from a midpoint Mp1 to end portion P1 shown in FIG. 2. In this case, a midpoint between end portion P1 and end portion P2 is different from the position shown in FIG. 2.

Midpoint Mp1 between end portion P1 and end portion P2 in the inside of heat insulating cover C1 is a point where a distance X1 from end portion P1 to midpoint Mp1 is the same as a distance X2 from end portion P2 to midpoint Mp1. As compared with positions other than midpoint Mp1 in the inside of heat insulating cover C1, midpoint Mp1 is longest in minimum distance, of a distance to end portion P1 and a distance to end portion P2. Therefore, midpoint Mp1 is a point in the inside of heat insulating cover C1 where heat is least likely to be released. Occurrence of excessive temperature increase is more likely in region Rg1 including midpoint Mp1 than other regions in the inside of heat insulating cover C1.

Therefore, in injection molding machine 100 in the first embodiment, heat pipes HR1 and HL1 shown in FIG. 2(B) are used to thermally connect region Rg1 and region Rg2 closer to end portion P1 than region Rg1 to each other, to thereby transfer heat in region Rg1 to region Rg2. More specifically, one end portions of heat pipes HR1 and HL1 are in contact with heat radiation plate B1 arranged closer to region Rg1 than region Rg2 and the other end portions of heat pipes HR1 and HL1 are in contact with heat radiation plate B2 arranged closer to region Rg2 than Rg1.

When the temperature of heat radiation plate B1 is higher than the temperature of heat radiation plate B2, heat pipes HR1 and HL1 lower the temperature of heat radiation plate B1 and increases the temperature of heat radiation plate B2. Prescribed liquid as working fluid is sealed in the inside of heat pipes HR1 ad HL1. The working fluid absorbs evaporation latent heat by being heated as a result of heat exchange with heat radiation plate B1 at one end portions of heat pipes HR1 and HL1 to cool heat radiation plate B1. The evaporated working fluid moves to the other end portions of heat pipes HR1 and HL1 through a pressure-reduced space or a vacuum space, exchanges heat with heat radiation plate B2 arranged on the other end portion side, releases evaporation latent heat, and is condensed. Thereafter, the condensed working fluid returns to a position where the working fluid has evaporated through an inner wall where a capillary structure (wick) is formed and circulates through flow channels in the inside of heat pipes HR1 and HL1. Heat pipes HR1 and HL1 can thus lower the temperature of heat radiation plate B1 and increase the temperature of heat radiation plate B2.

Heat pipes HR1 and HL1 in the first embodiment are constructed to temporarily cut off thermal connection between region Rg1 and region Rg2. More specifically, as shown in FIG. 2, heat pipes HR1 and HL1 are provided with actuators AR1 and AL1 that change arrangement of respective heat pipes HR1 and HL1. In other words, actuators AR1 and AL1 move respective heat pipes HR1 and HL1 themselves. Actuators AR1 and AL1 can change states of heat pipes HR1 and HL1 to a state in which they are in contact with both of heat radiation plates B1 and B2 and a state in which they are not in contact with at least one of heat radiation plates B1 and B2. Controller 40 has thermal connection by heat pipes HR1 and HL1 cut off based on satisfaction of a prescribed condition which will be described later. Heat radiation plates B1 and B2 are implemented by heat sinks that enhance heat emission efficiency, and they are made, for example, of a highly thermally conductive metal such as aluminum, iron, or copper.

Figure 3:
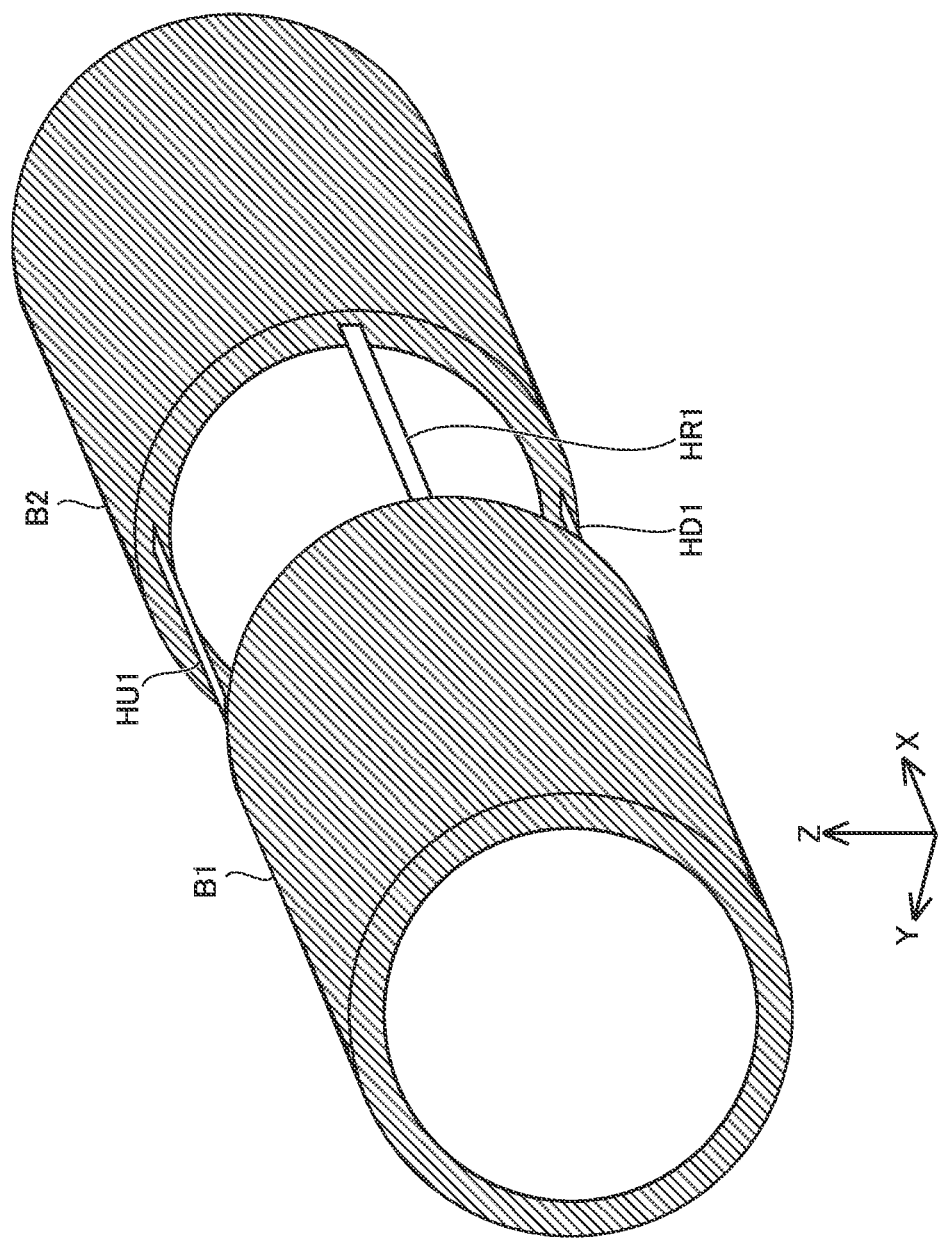
FIG. 3 is a perspective view for illustrating a heat radiation plate and a heat pipe.

FIG. 3 is a perspective view for illustrating heat radiation plates B1 and B2 and the heat pipe. FIG. 3 shows heat pipes HU1 and HD1 in addition to heat pipe HR1 shown in FIG. 2(B). As shown in FIG. 2(B), heat radiation plates B1 and B2 are each in a shape in conformity with the curved surface of the column similarly to heat insulating cover C1. Heat pipe HL1 shown in FIG. 2(B) is not seen in FIG. 3 by being hidden by heat radiation plate B1.

When viewed from the side of the negative direction along the X axis, heat pipe HR1 is arranged on the side of the negative direction along the Y axis with respect to screw 23 and heat pipe HL1 is arranged on the side of the positive direction along the Y axis with respect to screw 23. When viewed from the side of the negative direction along the X axis, heat pipe HU1 is arranged on the side of the positive direction along the Z axis with respect to screw 23 and heat pipe HD1 is arranged on the side of the negative direction along the Z axis with respect to screw 23. Heat pipes HR1, HL1, HD1, and HU1 may collectively be referred to as a "heat pipe H1" below.

In the first embodiment, heat pipes H1 are each in a rod shape and they are identical in shape. Each heat pipe H1 is in contact with heat radiation plate B1 and heat radiation plate B2. Though a construction in which four heat pipes H1 are provided is described in the first embodiment, a single heat pipe H1 or five or more heat pipes H1 may be provided, without being limited to four heat pipes H1.

As shown in FIG. 2, in injection molding machine 100 in the first embodiment, in the inside of heat insulating cover C1, region Rg1 where heat is less likely to be released and region Rg2 where heat is more likely to be released are thermally connected to each other through heat pipe H1. In other words, being provided with heat pipe H1, injection molding machine 100 in the first embodiment can lower the temperature of region Rg1 close to midpoint Mp1 where heat is least likely to be released and increase the temperature of region Rg2 in the vicinity of end portion P1 where heat is more likely to be released than region Rg1. The temperatures of the regions heated by respective heaters Ht1 and Ht2 in the inside of heat insulating cover C1 can be brought closer to respective set target temperatures, and excessive temperature increase in the inside of heat insulating cover C1 that covers cylinder 22 can be suppressed in injection molding machine 100 in the first embodiment.

Furthermore, as shown in FIG. 2, region Rg2 is closer to cooling apparatus R1 than region Rg1. In other words, region Rg2 that exchanges heat with heat pipe H1 with heat radiation plate B2 being interposed is closer to cooling apparatus R1 than the first region heated by heater Ht1. Therefore, region Rg2 can exchange heat with cooling apparatus R1 through end portion P1. In other words, the temperature of region Rg2 may be lowered by cooling by cooling apparatus R1.

In order to hold a high temperature of region Rg2, watt density of heater Ht2 may be increased. Provision of a heater high in watt density, however, may lead to increase in cost. When the heater high in watt density is provided, power consumption may also increase. Since heat is transferred from region Rg1 to region Rg2 through heat pipe H1 in injection molding machine 100 in the first embodiment, lowering in temperature of region Rg2 can be suppressed without providing the heater high in watt density as heater Ht2.

In the first embodiment, region Rg1 is an exemplary "first region" in the present disclosure. Region Rg2 is an exemplary "second region" in the present disclosure. Heat pipe HR1 is an exemplary "first heat pipe" in the present disclosure. Heat pipes HU1, HD1, and HL1 are each an exemplary "third heat pipe" in the present disclosure. Heat radiation plate B1 is an exemplary "first heat radiation body" in the present disclosure. Heat radiation plate B2 is an exemplary "second heat radiation body" in the present disclosure. End portion P1 is an exemplary "first end portion" in the present disclosure. End portion P2 is an exemplary "second end portion" in the present disclosure.

Though region Rg1 includes midpoint Mp1 in the example described with reference to FIG. 2, region Rg1 does not have to include midpoint Mp1 so long as region Rg1 is closer to midpoint Mp1 than region Rg2. In other words, region Rg1 should only be a region in the inside of heat insulating cover C1 where heat is less likely to be released than region Rg2.

[Comparison of Change in Temperature]

Figure 4:
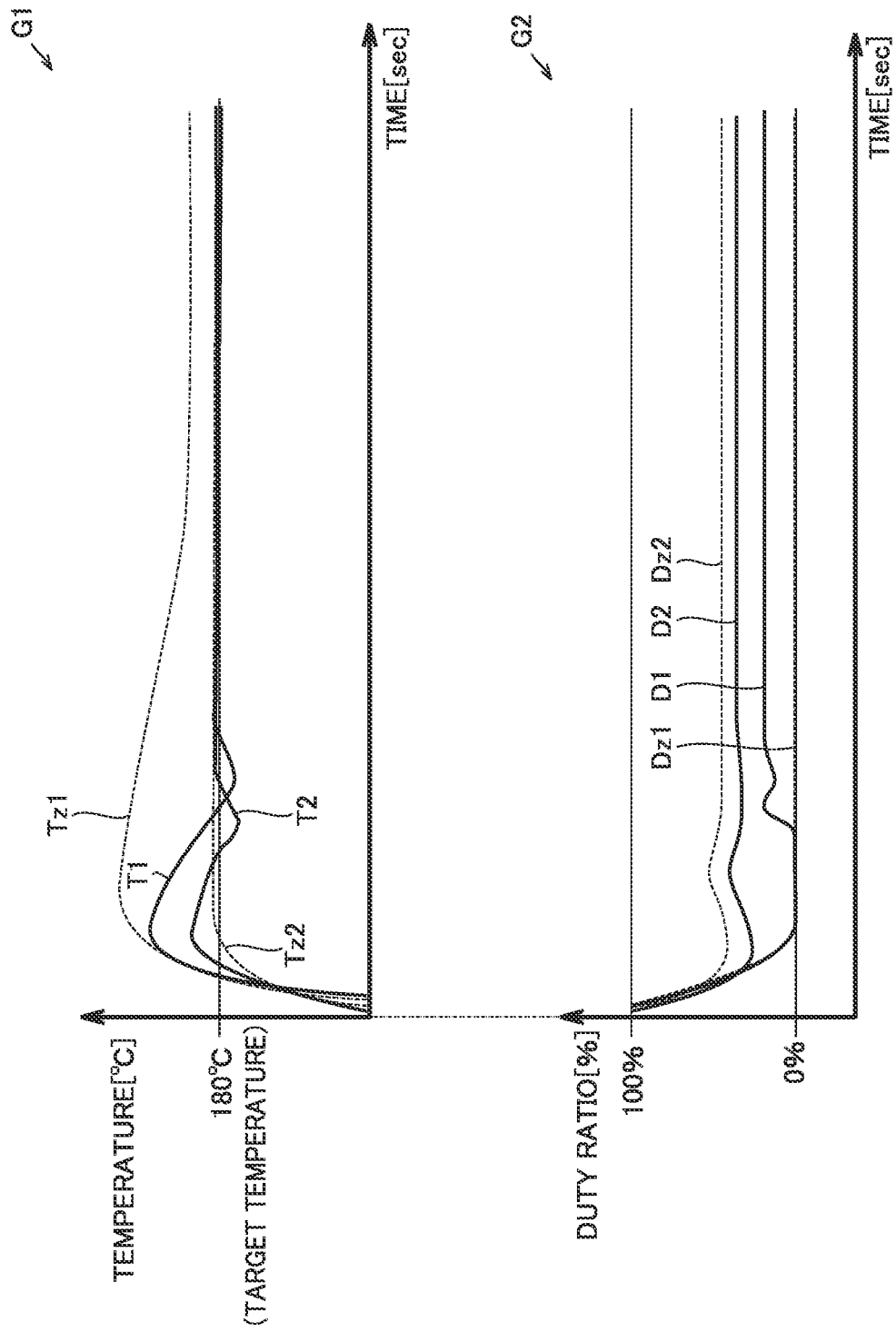
FIG. 4 is a first diagram showing a temperature detected by a temperature sensor and a duty ratio of a heater.

FIG. 4 is a first diagram showing temperatures detected by temperature sensors Sr1 and Sr2 and duty ratios of heaters Ht1 and Ht2. An upper tier in FIG. 4 shows a graph G1 of the temperatures detected by temperature sensors Sr1 and Sr2, and a lower tier in FIG. 4 shows a graph G2 of the duty ratios of heaters Ht1 and Ht2. Graph G1 and graph G2 share a time axis represented as an abscissa. The duty ratio refers to a ratio of an on period to one cycle, the one cycle being a total of the on period and an off period of the heater. As the duty ratio is higher, the temperature of the heater increases and power consumption also increases. As the duty ratio is lower, the temperature of the heater lowers and power consumption also lowers.

As shown in FIG. 2, heater Ht1 is arranged at a position for heating of region Rg1 and heater Ht2 is arranged at a position for heating of region Rg2. In other words, heaters Ht1 and Ht2 increase the temperatures of respective regions Rg1 and Rg2. Temperature sensors Sr1 and Sr2 detect the temperatures of respective regions Rg1 and Rg2.

As described above, cylinder 22 may be heated, for example, to a temperature of 180° ° C. to 350° C. by heaters Ht1 and Ht2. In other words, a possible range of the target temperature of cylinder 22 is, for example, from 180° C. to 350° C. The target temperature set for cylinder 22 may be different for each of regions Rg1 and Rg2 of cylinder 22 as described above.

In the example in FIG. 4, 180° C. is set as the target temperature of cylinder 22. In other words, a relatively low target temperature is set for cylinder 22. FIG. 4 illustrates suppression by injection molding machine 100 in the first embodiment, of occurrence of excessive temperature increase caused when a relatively low target temperature is set for cylinder 22.

Lines T1 and T2 in graph G1 represent detection temperatures detected by respective temperature sensors Sr1 and Sr2 in the first embodiment. Lines Tz1 and Tz2, on the other hand, represent detection temperatures detected by respective temperature sensors Sr1 and Sr2 in a comparative example. An injection molding machine resulting from removal of heat pipe H1 from injection molding machine 100 in the first embodiment represents the comparative example.

Controller 40 controls heaters Ht1 and Ht2 based on the detection temperatures obtained from temperature sensors Sr1 and Sr2. For example, controller 40 controls heaters Ht1 and Ht2 under PID control. Controller 40 can thus determine the duty ratios of heaters Ht1 and Ht2 in accordance with a difference between the target temperature and detection values from temperature sensors Sr1 and Sr2.

Instead of PID control, when the temperature detected by temperature sensor Sr1 is lower than the target temperature, controller 40 may increase the duty ratio of heater Ht1, and when the temperature detected by temperature sensor Sr1 is higher than the target temperature, controller 40 may lower the duty ratio of heater Ht1. Similarly, when the temperature detected by temperature sensor Sr2 is lower than the target temperature, controller 40 may increase the duty ratio of heater Ht2, and when the temperature detected by temperature sensor Sr2 is higher than the target temperature, controller 40 may lower the duty ratio of heater Ht2.

Lines D1 and D2 in graph G2 represent the duty ratios of respective heaters Ht1 and Ht2 in the first embodiment. Lines Dz1 and Dz2, on the other hand, represent the duty ratios of respective heaters Ht1 and Ht2 in the comparative example.

In succession, attention is paid to lines Tz1 and Dz1 in the comparative example in FIG. 4. In the comparative example without heat pipe H1, as the temperatures detected by temperature sensors Sr1 and Sr2 are closer to the target temperatures, controller 40 controls the duty ratios of heaters Ht1 and Ht2 to lower. In other words, when the target temperature is reached, controller 40 lowers the duty ratio in order to maintain the target temperature.

After the target temperature is exceeded, as shown with line Tz1 in graph G1, a large overshoot occurs in the temperature detected by temperature sensor Sr1 in the comparative example. This is because region Rg1 heated by heater Ht1 is a region where heat is less likely to be released as described above.

As the temperature detected by temperature sensor Sr1 becomes significantly higher than the target temperature, controller 40 maintains a state in which the duty ratio of heater Ht1 is 0% as shown with line Dz1. In other words, electric power is no longer supplied to heater Ht1. Region Rg1, however, is the region where heat is less likely to be released. Therefore, in the comparative example, the temperature detected by temperature sensor Sr1 cannot be lowered to the target temperature and a state in which the temperature is higher than the target temperature is maintained. When the state in which the temperature is higher than the target temperature is maintained, excessive temperature increase may occur in the inside of heat insulating cover C1.

Attention is then paid to lines T1 and D1 in the first embodiment. In the first embodiment in which heat pipe H1 is provided, after the temperature detected by temperature sensor Sr1 becomes higher than the target temperature, an overshoot on line T1 is smaller than the overshoot on line Tz1. This is because heat pipe H1 transfers heat in region Rg1 to region Rg2. Thus, the first embodiment is earlier in timing of control of the temperature detected by temperature sensor Sr1 to the target temperature than the comparative example, and maintenance of the state in which the temperature is higher than the target temperature can be suppressed.

Figure 5:
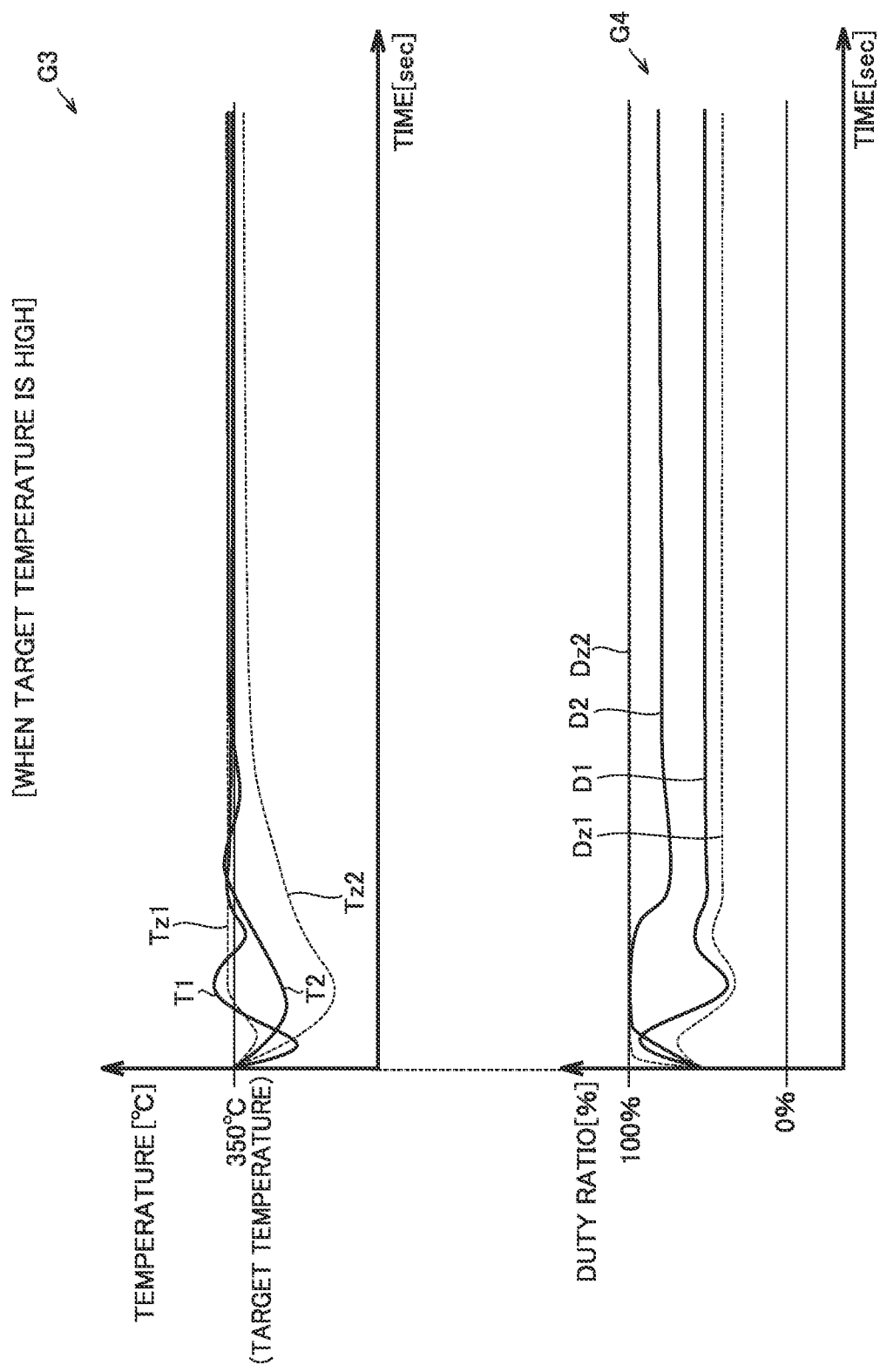
FIG. 5 is a second diagram showing the temperature detected by the temperature sensor and the duty ratio of the heater.

FIG. 5 is a second diagram showing the temperatures detected by temperature sensors Sr1 and Sr2 and the duty ratios of heaters Ht1 and Ht2. An upper tier in FIG. 5 shows a graph G3 of the temperatures detected by temperature sensors Sr1 and Sr2, and a lower tier in FIG. 5 shows a graph G4 of the duty ratios of heaters Ht1 and Ht2. Graph G3 and graph G4 share a time axis represented as an abscissa.

In an example in FIG. 5, 350° ° C. is set as the target temperature for cylinder 22. A relatively high target temperature is set for cylinder 22. FIG. 5 illustrates suppression by injection molding machine 100 in the first embodiment, of occurrence of an insufficient temperature caused when the relatively high target temperature is set for cylinder 22.

Attention is paid to lines Tz2 and Dz2 in the comparative example in FIG. 5. The temperature of region Rg2 may lower due to such an external factor as drive of cooling apparatus R1 or change in type of the injection material in the comparative example without heat pipe H1. In other words, the temperatures detected by temperature sensors Sr1 and Sr2 are lower than the target temperatures. Thus, controller 40 controls the duty ratios of heaters Ht1 and Ht2 to increase. In the example in FIG. 5, with lowering in temperature detected by temperature sensor Sr2 shown with line Tz2, controller 40 keeps a state in which the duty ratio of heater Ht2 has been increased to a maximum value (100%).

In the comparative example, however, heat in heat insulating cover C1 is released from end portion P1 due to such an external factor as drive of cooling apparatus R1. Therefore, the temperature of region Rg2 close to end portion P1 cannot be increased to the target temperature and a state in which the temperature is insufficient is maintained.

Attention is then paid to lines T2 and D2 in the first embodiment. In the first embodiment where heat pipe H1 is provided, after the temperature detected by temperature sensor Sr2 is lowered, unlike line Tz2, the temperature converges to the target temperature at early timing. This is because heat pipe H1 transfers heat in region Rg1 to region Rg2. Thus, as shown with line T2, in the first embodiment, the temperature detected by temperature sensor Sr2 is controlled to the target temperature earlier than in the comparative example, and maintenance of the state in which the temperature is insufficient in region Rg2 can be suppressed.

First Control Example

The construction in which heat in region Rg1 where heat is less likely to be released is transferred through heat pipe H1 to region Rg2 where heat is more likely to be released is described with reference to FIGS. 2 to 5. Heat pipe H1, however, may cause excessive lowering in temperature of region Rg1 or excessive increase in temperature of region Rg2. Processing for cutting off thermal connection by heat pipe H1 on the occurrence of excessive lowering in temperature of region Rg1 or excessive increase in temperature of region Rg2 will be described with reference to FIGS. 6 and 7.

Figure 6:
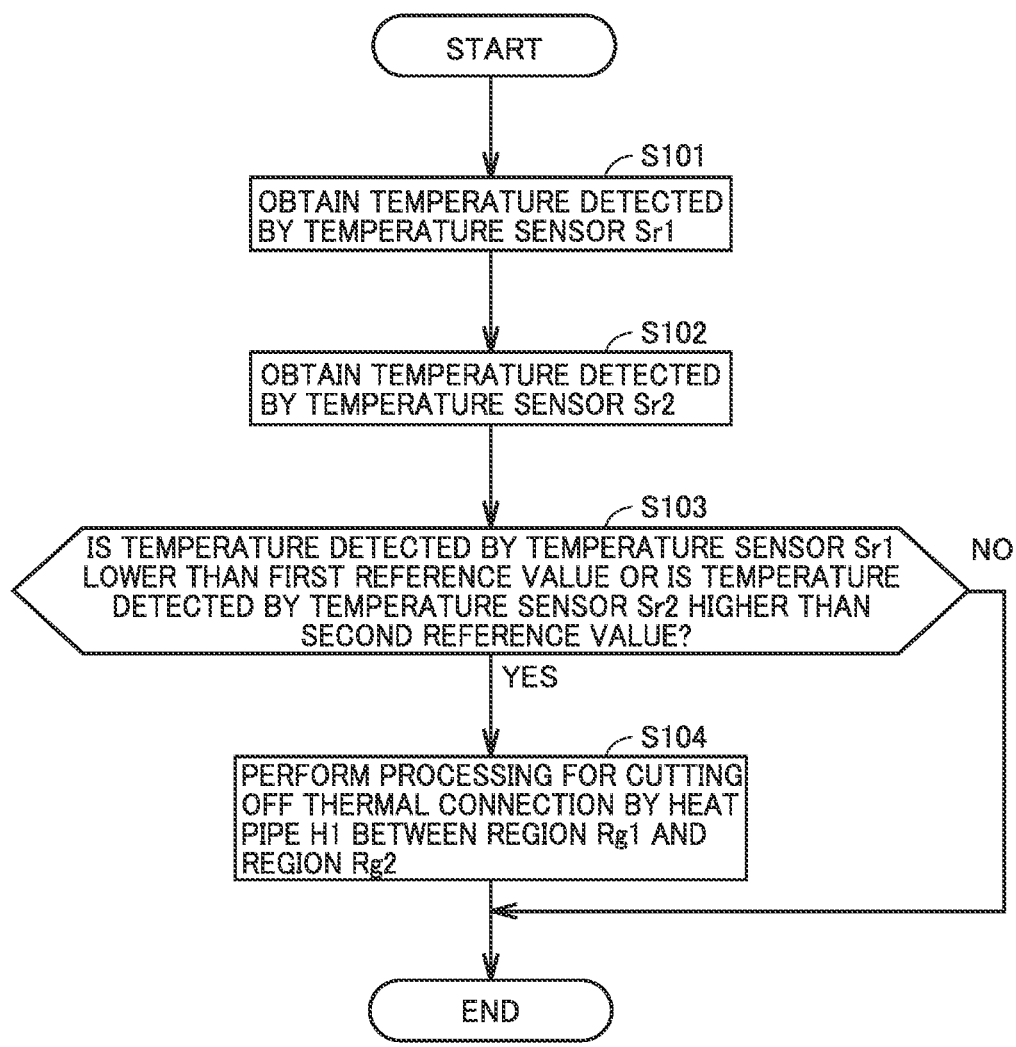
FIG. 6 shows a first example of control for cutting off thermal connection by a heat pipe.

FIG. 6 shows a first example of control for cutting off thermal connection by heat pipe H1. A flowchart shown in FIG. 6 is stored as a program in a storage that can be accessed by controller 40. Controller 40 repeats execution of the flowchart shown in FIG. 6 while injection molding machine 100 performs the injection molding processing.

Controller 40 obtains the temperature detected by temperature sensor Sr1 that detects the temperature of region Rg1 (step S101). Controller 40 obtains the temperature detected by temperature sensor Sr2 that detects the temperature of region Rg2 (step S102). Controller 40 compares the temperature detected by temperature sensor Sr1 obtained in step S101 with a first reference value, and compares the temperature detected by temperature sensor Sr2 obtained in step S102 with a second reference value.

The first reference value is, for example, a lower limit value of the temperature set for region Rg1. The first reference value may be larger by a prescribed temperature than the lower limit value of the temperature set for region Rg1. The second reference value is, for example, an upper limit value of the temperature set for region Rg2. The second reference value may be smaller by a prescribed temperature than the upper limit value of the temperature set for region Rg2. Since heat pipe H1 is provided for transfer of heat from region Rg1 to region Rg2, the first reference value represents a temperature higher than the second reference value.

The first reference value represents a temperature at which insufficiency in heat may occur in region Rg1. The second reference value represents a temperature at which excessive temperature increase may occur in region Rg2. The first reference value and the second reference value are determined in accordance with the target temperature. Controller 40 determines whether or not the temperature detected by temperature sensor Sr1 is lower than the first reference value or whether or not the temperature detected by temperature sensor Sr2 is higher than the second reference value (step S103).

When the temperature detected by temperature sensor Sr1 is lower than the first reference value or when the temperature detected by temperature sensor Sr2 is higher than the second reference value (YES in step S103), controller 40 performs processing for cutting off thermal connection by heat pipe H1 between region Rg1 and region Rg2 (step S104). When the temperature detected by temperature sensors Sr1 is not lower than the first reference value and when the temperature detected by temperature sensor Sr2 is not higher than the second reference value (NO in step S103), controller 40 quits the process.

The processing for cutting off thermal connection by heat pipe H1 in step S104 will be described below. The processing for cutting off thermal connection in step S104 is processing for driving actuators AR1 and AL1 provided in heat pipe H1 described above. As actuators AR1 and AL1 are driven, heat pipe H1 is no longer in contact with heat radiation plate B1 or heat radiation plate B2. Thermal connection by heat pipe H1 is thus cut off. In other words, heat in region Rg1 is no longer transferred to region Rg2. Injection molding machine 100 can thus cut off thermal connection between region Rg1 and region Rg2 without workloads being imposed on a user. Actuators AR1 and AL1 may drive a switching apparatus provided in the flow channel in heat pipe H1 to thereby stop circulation of working fluid through heat pipe H1.

Alternatively, the processing for cutting off thermal connection in step S104 may be, for example, processing for notifying that heat pipe H1 is to be disconnected. Specifically, controller 40 notifies the user that heat pipe H1 is to be disconnected through display apparatus 31, a not-shown speaker, an indicator, or the like. Thus, injection molding machine 100 can notify the outside of possibility of the insufficient temperature of region Rg1 or excessive temperature increase in region Rg2 due to arrangement of heat pipe H1.

The processing for cutting off thermal connection in step S104 may be either processing for cut-off by a disconnection circuit or processing for notifying the user that heat pipe H1 is to be disconnected, or both of them may simultaneously be performed. Temperature sensor Sr1 is an exemplary "first temperature sensor" in the present disclosure. Temperature sensor Sr2 is an exemplary "second temperature sensor" in the present disclosure.

Second Control Example

Figure 7:
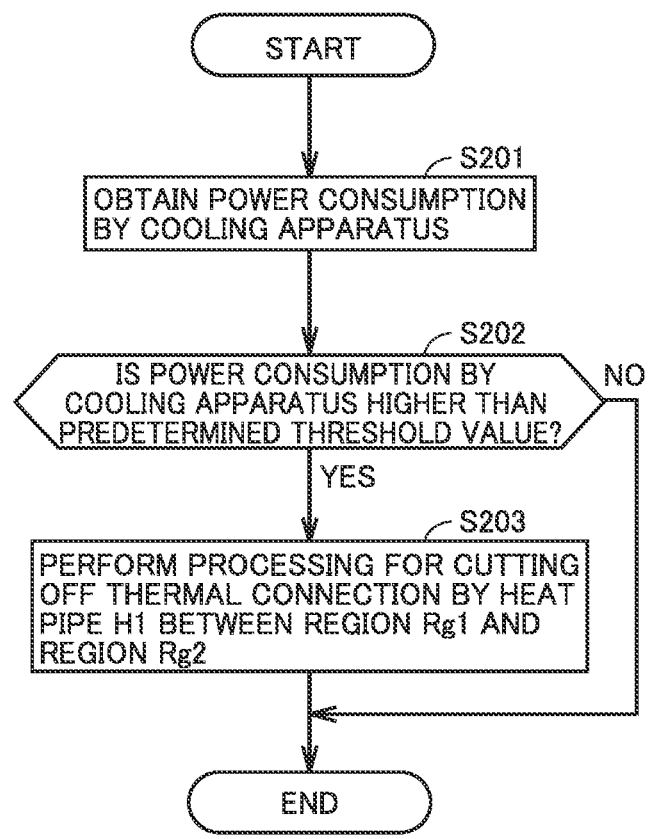
FIG. 7 shows a second example of control for cutting off thermal connection by the heat pipe.

The control example in which cut-off processing is performed based on comparison of the temperatures detected by temperature sensors Sr1 and Sr2 with the first reference value and the second reference value, respectively, is described with reference to FIG. 6. FIG. 7 illustrates a control example in which cut-off processing is performed based on power consumption by cooling apparatus R1.

As described above, controller 40 can adjust output of cooling apparatus R1 and adjusts output of cooling apparatus R1 in accordance with a temperature detected by temperature sensor Sr4 that detects the temperature of cooling water in cooling apparatus R1. Specifically, when the temperature of cooling water increases, controller 40 increases output of cooling apparatus R1, and when the temperature of cooling water lowers, controller 40 lowers output of cooling apparatus R1. With increase in output of cooling apparatus R1, electric power consumed by cooling apparatus R1 increases.

FIG. 7 shows a second example of control for cutting off thermal connection by heat pipe H1. A flowchart shown in FIG. 7 is stored as a program in a storage that can be accessed by controller 40. Controller 40 repeats execution of the flowchart shown in FIG. 7 while injection molding machine 100 performs the injection molding processing.

Controller 40 obtains power consumption by cooling apparatus R1 (step S201). In other words, controller 40 obtains output of cooling apparatus R1. Output of cooling apparatus R1 is determined by the number of rotations of the motor for circulation of cooling water.

Controller 40 determines whether or not power consumption by cooling apparatus R1 is higher than a predetermined threshold value (step S202). When power consumption is higher than the predetermined threshold value (YES in step S202), controller 40 performs the processing for cutting off thermal connection by heat pipe H1 (step S203) as in step S104 described with reference to FIG. 6. When power consumption is not higher than the predetermined threshold value (NO in step S202), controller 40 quits the process.

Thus, when the temperature of region Rg2 excessively increases due to heat pipe H1 and electric power consumed by cooling apparatus R1 increases, injection molding machine 100 in the first embodiment can perform the processing for cutting off thermal connection.

Second Embodiment

Figure 8:
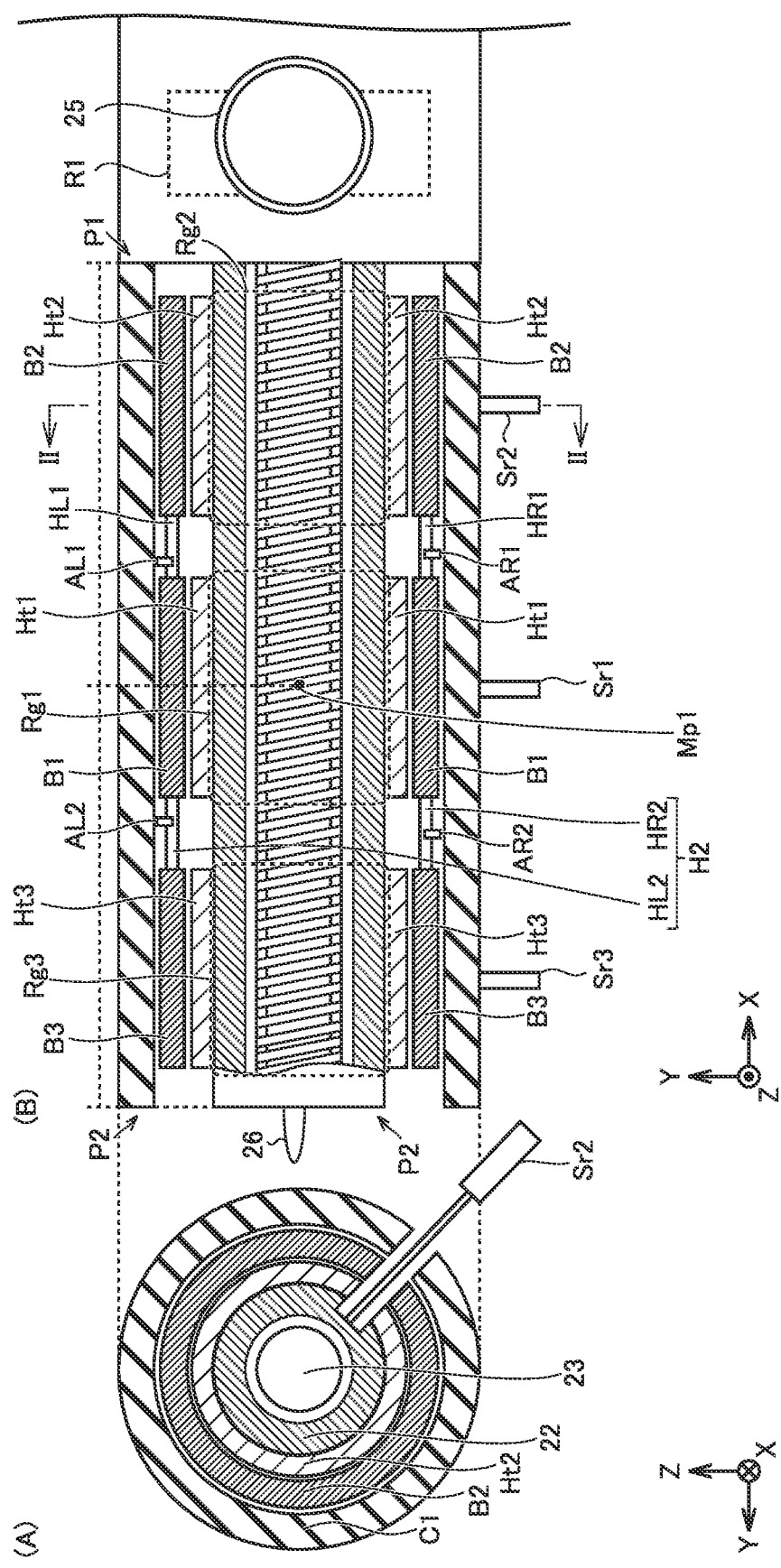
FIG. 8 is a diagram for illustrating a structure of the heat insulating cover and the cylinder in a second embodiment.

An injection molding machine in a second embodiment will be described below with reference to FIG. 8. FIG. 8 is a diagram for illustrating a structure of heat insulating cover C1 and cylinder 22 in the second embodiment. Description of a feature in the second embodiment similar to that in the first embodiment will not be repeated.

FIG. 8(A) is a cross-sectional view of heat insulating cover C1 and cylinder 22 when viewed from the side of the negative direction along the X axis in the second embodiment. FIG. 8(B) is a diagram showing heat insulating cover C1 and cylinder 22 when viewed from the side of the positive direction along the Z axis in the second embodiment. The line II-II in FIG. 8(B) indicates a position of the cross-section shown in FIG. 8(A).

In the second embodiment, heat pipes HR2 and HL2 are provided in addition to heat pipes HR1 and HL1. Heat pipes HR2 and HL2 are collectively referred to as a "heat pipe H2" below. Heat pipe H2 may include four heat pipes similarly to heat pipe H1, or may include five or more heat pipes.

In injection molding machine 100 in the second embodiment, heat pipe H2 is used to thermally connect region Rg1 and a region Rg3 closer to end portion P2 than region Rg1 to each other, to thereby transfer heat in region Rg1 to region Rg3. Region Rg1 is closer to midpoint Mp1 than region Rg3. As shown in FIG. 8, region Rg3 is closer to injection nozzle 26 than region Rg1. Therefore, heat in region Rg3 tends to be released as a result of heat exchange with injection nozzle 26 through end portion P2. A heat radiation plate B3 and a heater Ht3 are arranged in region Rg3. Injection molding machine 100 further includes a temperature sensor Sr3 that detects a temperature of region Rg3.

As shown in FIG. 8, in injection molding machine 100 in the second embodiment, in the inside of heat insulating cover C1, region Rg1 where heat is less likely to be released and region Rg3 where heat is more likely to be released are thermally connected to each other through heat pipe H2. In other words, being provided with heat pipe H2, injection molding machine 100 in the second embodiment can lower the temperature of region Rg1 including midpoint Mp1 where heat is least likely to be released and increase the temperature of region Rg3 in the vicinity of end portion P2 where heat is more likely to be released than region Rg1. The temperatures of the respective regions heated by heaters Ht1 to Ht3 in the inside of heat insulating cover C1 can be close to the set target temperatures, and injection molding machine 100 in the second embodiment can achieve suppression of excessive temperature increase in the inside of heat insulating cover C1 that covers cylinder 22.

Heat pipe H2 is an exemplary "second heat pipe" in the present disclosure. Region Rg3 is an exemplary "third region" in the present disclosure.

Figure 9:
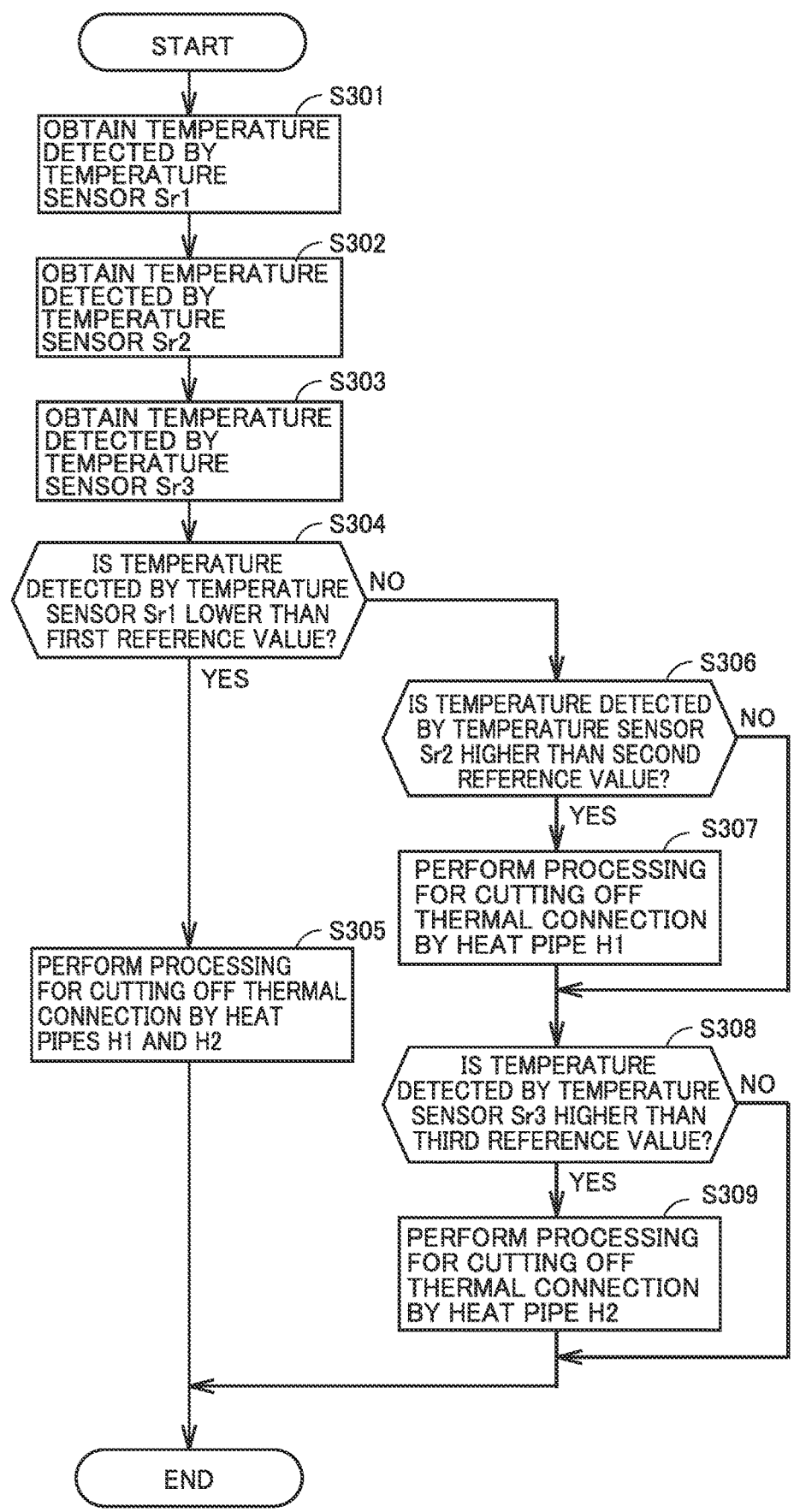
FIG. 9 shows exemplary control for cutting off thermal connection by the heat pipe in the second embodiment.

FIG. 9 shows exemplary control for cutting off thermal connection by heat pipes H1 and H2 in the second embodiment. Controller 40 repeats execution of the flowchart shown in FIG. 9 while injection molding machine 100 performs the injection molding processing.

Controller 40 obtains the temperature detected by temperature sensor Sr1 that detects the temperature of region Rg1 (step S301). Controller 40 obtains the temperature detected by temperature sensor Sr2 that detects the temperature of region Rg2 (step S302). Controller 40 obtains the temperature detected by temperature sensor Sr3 that detects the temperature of region Rg3 (step S303). Controller 40 compares the temperature detected by temperature sensors Sr1 obtained in step S301 with the first reference value as in step S101 in FIG. 6.

Controller 40 determines whether or not the temperature detected by temperature sensor Sr1 is lower than the first reference value (step S304). When the temperature detected by temperature sensor Sr1 is lower than the first reference value (YES in step S304), controller 40 performs processing for cutting off thermal connection by heat pipes H1 and H2 (step S305). Thus, injection molding machine 100 in the second embodiment can suppress the insufficient temperature of region Rg1. When the temperature detected by temperature sensor Sr1 is not lower than the first reference value (NO in step S304), controller 40 compares the temperature detected by temperature sensor Sr2 obtained in step S302 with the second reference value. In other words, controller 40 determines whether or not the temperature detected by temperature sensor Sr2 is higher than the second reference value (step S306). When the temperature detected by temperature sensor Sr2 is higher than the second reference value (YES in step S306), controller 40 performs processing for cutting off thermal connection by heat pipe H1 (step S307). Injection molding machine 100 in the second embodiment can thus suppress occurrence of excessive temperature increase in region Rg2. When the temperature detected by temperature sensor Sr2 is not lower than the second reference value (NO in step S306), controller 40 compares the temperature detected by temperature sensor Sr3 obtained in step S303 with a third reference value.

The third reference value is, for example, an upper limit value of the temperature set for region Rg3. The third reference value may be smaller by a prescribed temperature than the upper limit value of the temperature set for region Rg3. Since heat pipe H2 is provided for transfer of heat from region Rg1 to region Rg3, the first reference value represents a temperature higher than the third reference value.

Controller 40 determines whether or not the temperature detected by temperature sensor Sr3 is higher than the third reference value (step S308). When the temperature detected by temperature sensor Sr3 is higher than the third reference value (YES in step S308), controller 40 performs processing for cutting off thermal connection by heat pipe H2 (step S309). Injection molding machine 100 in the second embodiment can thus suppress occurrence of excessive temperature increase in region Rg3. When the temperature detected by temperature sensor Sr3 is not lower than the third reference value (NO in step S308), controller 40 quits the process. The control example described with reference to FIG. 6 can thus be applied also to the construction in the second embodiment by taking into consideration, the detection value from temperature sensor Sr3. The flowchart similar to that in the control example described with reference to FIG. 7 can be applied as it is to the construction in the second embodiment.

Third Embodiment

An injection molding machine in a third embodiment will be described below with reference to FIG. 10. FIG. 10 is a diagram for illustrating a structure of heat insulating cover C1 and cylinder 22 in the third embodiment. Description of a feature in the third embodiment similar to that in the first and second embodiments will not be repeated.

FIG. 10(A) is a cross-sectional view of heat insulating cover C1 and cylinder 22 when viewed from the side of the negative direction along the X axis in the third embodiment. FIG. 10(B) is a diagram showing heat insulating cover C1 and cylinder 22 when viewed from the side of the positive direction along the Z axis in the third embodiment. The line II-II in FIG. 10(B) indicates a position of the cross-section shown in FIG. 10(A).

Injection molding machine 100 in the third embodiment is different in position of region Rg2 from the first embodiment. As shown in FIG. 10, region Rg2 is closer to injection nozzle 26 than region Rg1. Therefore, heat in region Rg2 tends to be radiated through end portion P2.

In injection molding machine 100 in the third embodiment, in the inside of heat insulating cover C1, region Rg1 where heat is less likely to be released is thermally connected through heat pipe H1 to region Rg2 where heat is more likely to be released. In other words, being provided with heat pipe H1, injection molding machine 100 in the third embodiment can lower the temperature of region Rg1 including midpoint Mp1 where heat is least likely to be released and increase the temperature of region Rg2 in the vicinity of end portion P2 where heat is more likely to be released than region Rg1. The temperatures of the regions heated by respective heaters Ht1 and Ht2 in the inside of heat insulating cover C1 can thus be closer to the set temperatures, and injection molding machine 100 in the third embodiment can suppress occurrence of excessive temperature increase in the inside of heat insulating cover C1 that covers cylinder 22.

In the third embodiment, heat pipe H1 is an exemplary "first heat pipe" in the present disclosure. Region Rg1 is an exemplary "first region" in the present disclosure. Region Rg2 is an exemplary "second region" in the present disclosure.

Additional Aspects

Illustrative embodiments described above are understood by a person skilled in the art as specific examples of aspects below.

(Clause 1) An injection molding machine in the present disclosure includes a cylinder that kneads an injection material supplied from outside and supplies the kneaded injection material to the outside, a heat insulating cover that covers a side surface of the cylinder, the heat insulating cover including a first end portion and a second end portion, a heater arranged between the heat insulating cover and the cylinder, the heater heating a first region of the cylinder, and a first heat pipe that thermally connects the first region and a second region of the cylinder to each other, the second region being different from the first region. The first region is closer to a midpoint between the first end portion and the second end portion than the second region.

According to injection molding machine 100 described in Clause 1, occurrence of excessive temperature increase in the inside of the heat insulating cover that covers the cylinder can be suppressed. In other words, heat in the first region where heat tends to concentrate because of the heat insulating cover can be transferred to the second region where heat is more likely to be released and excessive temperature increase in the first region can be suppressed.

(Clause 2) The injection molding machine according to Clause 1 further includes a cooling apparatus that cools the injection material supplied to the cylinder. The second region is closer to the cooling apparatus than the first region.

According to injection molding machine 100 described in Clause 2, occurrence of an insufficient temperature of the second region where heat is more likely to be released because of the cooling apparatus can be suppressed.

(Clause 3) The injection molding machine according to Clause 1 further includes a nozzle that injects the kneaded injection material into a mold. The second region is closer to the nozzle than the first region.

According to injection molding machine 100 described in Clause 3, occurrence of the insufficient temperature of the second region where heat is more likely to be released because of the nozzle can be suppressed.

(Clause 4) The injection molding machine according to Clause 2 further includes a nozzle that injects the kneaded injection material into a mold and a second heat pipe that thermally connects a third region in inside of the heat insulating cover and the first region to each other. The third region is closer to the nozzle than the first region and the first region is closer to the midpoint than the third region.

According to injection molding machine 100 described in Clause 4, occurrence of the insufficient temperature of the second region where heat is more likely to be released because of the cooling apparatus and the third region where heat is more likely to be released because of the nozzle can be suppressed.

(Clause 5) The injection molding machine according to any one of Clauses 1 to 4 further includes a first temperature sensor that detects a temperature of the first region, a second temperature sensor that detects a temperature of the second region, and a controller connected to the first temperature sensor and the second temperature sensor. The controller is configured to obtain the temperature detected by the first temperature sensor, to obtain the temperature detected by the second temperature sensor, and to perform processing for cutting off thermal connection between the first region and the second region by the first heat pipe when the temperature detected by the first temperature sensor is lower than a first reference value or when the temperature detected by the second temperature sensor is higher than a second reference value. The first reference value represents a temperature higher than the second reference value.

According to injection molding machine 100 described in Clause 5, when the temperatures detected by the first temperature sensor and the second temperature sensor exceed respective threshold values, a state in which the heat pipe should be disconnected can be detected and cut-off processing can be performed.

(Clause 6) The injection molding machine according to Clause 4 further includes a first temperature sensor that detects a temperature of the first region, a second temperature sensor that detects a temperature of the second region, a third temperature sensor that detects a temperature of the third region, and a controller connected to the first temperature sensor, the second temperature sensor, and the third temperature sensor. The controller is configured to obtain the temperature detected by the first temperature sensor, to obtain the temperature detected by the second temperature sensor, to obtain the temperature detected by the third temperature sensor, to perform processing for cutting off thermal connection between the first region and the second region by the first heat pipe and cutting off thermal connection between the first region and the third region by the second heat pipe when the temperature detected by the first temperature sensor is lower than a first reference value, to perform processing for cutting off thermal connection between the first region and the second region by the first heat pipe when the temperature detected by the second temperature sensor is higher than a second reference value, and to perform processing for cutting off thermal connection between the first region and the third region by the second heat pipe when the temperature detected by the third temperature sensor is higher than a third reference value. The first reference value represents a temperature higher than the second reference value and the third reference value.

According to injection molding machine 100 described in Clause 6, when the temperatures detected by the first temperature sensor to the third temperature sensor exceed respective threshold values, a state in which at least one of the two heat pipes should be disconnected can be detected and cut-off processing can be performed.

(Clause 7) The injection molding machine according to Clause 2 further includes a controller that obtains power consumption by the cooling apparatus and adjusts output of the cooling apparatus. The controller is configured to perform processing for cutting off thermal connection between the first region and the second region by the first heat pipe when power consumption by the cooling apparatus is higher than a predetermined threshold value.

According to injection molding machine 100 described in Clause 7, when the temperature of the second region excessively increases because of the heat pipe, excessive temperature increase of the second region can be detected based on power consumption by the cooling apparatus and processing for cutting off transfer of heat by the heat pipe can be performed.

(Clause 8) In the injection molding machine according to any one of Clauses 5 to 7, the processing for cutting off thermal connection is processing for giving a notification that the first heat pipe is to be disconnected.

According to injection molding machine 100 described in Clause 8, a user can be notified that the heat pipe is to be disconnected.

(Clause 9) The injection molding machine according to any one of Clauses 5 to 7 further includes an actuator that changes arrangement of the first heat pipe. The processing for cutting off thermal connection is processing for cutting off thermal connection between the first region and the second region by change in arrangement of the first heat pipe by the actuator.

According to injection molding machine 100 described in Clause 9, a flow channel in the heat pipe can automatically be cut off without workloads being imposed on a user.

(Clause 10) The injection molding machine according to any one of Clauses 1 to 9 further includes a first heat radiation body arranged closer to the first region than the second region and a second heat radiation body arranged closer to the second region than the first region. The first heat pipe is thermally connected to the first region with the first heat radiation body being interposed and thermally connected to the second region with the second heat radiation body being interposed.

According to injection molding machine 100 described in Clause 10, efficient transfer of heat between the first region and the second region can be promoted with the use of the heat radiation body.

(Clause 11) The injection molding machine according to any one of Clauses 1 to 10 further includes a third heat pipe that thermally connects the first region and the second region to each other.

According to injection molding machine 100 described in Clause 11, efficient transfer of heat between the first region and the second region can be promoted with the use of a plurality of heat pipes.

Though embodiments of the present invention have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. An injection molding machine comprising:
   a cylinder that kneads an injection material supplied from outside and supplies the kneaded injection material to the outside;
   a heat insulating cover that covers a side surface of the cylinder, the heat insulating cover including a first end portion and a second end portion;
   a heater arranged between the heat insulating cover and the cylinder, the heater heating a first region of the cylinder; and
   a first heat pipe that thermally connects the first region and a second region of the cylinder to each other, the second region being different from the first region, wherein
   the first region is closer to a midpoint between the first end portion and the second end portion than the second region.

2. The injection molding machine according to claim 1, further comprising a cooling apparatus that cools the injection material supplied to the cylinder, wherein
   the second region is closer to the cooling apparatus than the first region.

3. The injection molding machine according to claim 1, further comprising a nozzle that injects the kneaded injection material into a mold, wherein
   the second region is closer to the nozzle than the first region.

4. The injection molding machine according to claim 2, further comprising:
   a nozzle that injects the kneaded injection material into a mold; and
   a second heat pipe that thermally connects a third region in inside of the heat insulating cover and the first region to each other, wherein
   the third region is closer to the nozzle than the first region, and the first region is closer to the midpoint than the third region.

5. The injection molding machine according to claim 1, further comprising:
a first temperature sensor that detects a temperature of the first region;
a second temperature sensor that detects a temperature of the second region; and
a controller connected to the first temperature sensor and the second temperature sensor, wherein
the controller is configured to
obtain the temperature detected by the first temperature sensor,
obtain the temperature detected by the second temperature sensor, and
perform processing for cutting off thermal connection between the first region and the second region by the first heat pipe when the temperature detected by the first temperature sensor is lower than a first reference value or when the temperature detected by the second temperature sensor is higher than a second reference value, and
the first reference value represents a temperature higher than the second reference value.

6. The injection molding machine according to claim 4, further comprising:
a first temperature sensor that detects a temperature of the first region;
a second temperature sensor that detects a temperature of the second region;
a third temperature sensor that detects a temperature of the third region; and
a controller connected to the first temperature sensor, the second temperature sensor, and the third temperature sensor, wherein
the controller is configured to
obtain the temperature detected by the first temperature sensor,
obtain the temperature detected by the second temperature sensor,
obtain the temperature detected by the third temperature sensor,
perform processing for cutting off thermal connection between the first region and the second region by the first heat pipe and cutting off thermal connection between the first region and the third region by the second heat pipe when the temperature detected by the first temperature sensor is lower than a first reference value,
perform processing for cutting off thermal connection between the first region and the second region by the first heat pipe when the temperature detected by the second temperature sensor is higher than a second reference value, and
perform processing for cutting off thermal connection between the first region and the third region by the second heat pipe when the temperature detected by the third temperature sensor is higher than a third reference value, and
the first reference value represents a temperature higher than the second reference value and the third reference value.

7. The injection molding machine according to claim 2, further comprising a controller that obtains power consumption by the cooling apparatus and adjusts output of the cooling apparatus, wherein
the controller is configured to perform processing for cutting off thermal connection between the first region and the second region by the first heat pipe when power consumption by the cooling apparatus is higher than a predetermined threshold value.

8. The injection molding machine according to claim 5, wherein
the processing for cutting off thermal connection is processing for giving a notification that the first heat pipe is to be disconnected.

9. The injection molding machine according to claim 5, further comprising an actuator that changes arrangement of the first heat pipe, wherein
the processing for cutting off thermal connection is processing for cutting off thermal connection between the first region and the second region by change in arrangement of the first heat pipe by the actuator.

10. The injection molding machine according to claim 1, further comprising:
a first heat radiation body arranged closer to the first region than the second region; and
a second heat radiation body arranged closer to the second region than the first region, wherein
the first heat pipe is
thermally connected to the first region with the first heat radiation body being interposed, and
thermally connected to the second region with the second heat radiation body being interposed.

11. The injection molding machine according to claim 1, further comprising a third heat pipe that thermally connects the first region and the second region to each other.

* * * * *